United States Patent
Chen et al.

(10) Patent No.: US 7,917,894 B2
(45) Date of Patent: Mar. 29, 2011

(54) CONSTRAINING SOURCE CODE AND OBJECTS FOR ANALYSIS TOOLS

(75) Inventors: Xuan Zhang Chen, North York (CA); Kushal Sayeed Munir, Toronto (CA); David Kenneth McKnight, Newmarket (CA); Li Ding, North York (CA); Vadim Berestetsky, North York (CA)

(73) Assignee: International Business Machines Corporation, Armonk, NY (US)

( * ) Notice: Subject to any disclaimer, the term of this patent is extended or adjusted under 35 U.S.C. 154(b) by 1544 days.

(21) Appl. No.: 11/144,092

(22) Filed: Jun. 3, 2005

(65) Prior Publication Data

US 2006/0277528 A1 Dec. 7, 2006

(51) Int. Cl.
*G06F 9/44* (2006.01)
(52) U.S. Cl. ........ 717/124; 717/125; 717/126; 717/127; 717/128; 717/129; 717/130; 717/131
(58) Field of Classification Search .................... 717/129
See application file for complete search history.

(56) References Cited

U.S. PATENT DOCUMENTS

| | | | | |
|---|---|---|---|---|
| 5,901,315 | A * | 5/1999 | Edwards et al. | 717/124 |
| 6,078,743 | A | 6/2000 | Apte et al. | |
| 6,324,683 | B1 * | 11/2001 | Fuh et al. | 717/124 |
| 6,598,181 | B1 * | 7/2003 | Pennell | 714/38 |
| 6,604,099 | B1 | 8/2003 | Chung et al. | |
| 6,629,065 | B1 | 9/2003 | Gadh et al. | |
| 7,000,224 | B1 * | 2/2006 | Osborne et al. | 717/125 |
| 7,287,259 | B2 * | 10/2007 | Grier et al. | 719/331 |
| 7,353,427 | B2 * | 4/2008 | Bates et al. | 714/38 |
| 2002/0104071 | A1 * | 8/2002 | Charisius et al. | 717/109 |
| 2003/0004671 | A1 * | 1/2003 | Minematsu | 702/123 |
| 2003/0149961 | A1 * | 8/2003 | Kawai et al. | 717/129 |
| 2004/0054991 | A1 * | 3/2004 | Harres | 717/131 |
| 2004/0088681 | A1 * | 5/2004 | Berg et al. | 717/120 |
| 2004/0172623 | A1 * | 9/2004 | Eckels et al. | 717/125 |
| 2004/0255278 | A1 * | 12/2004 | Bates et al. | 717/129 |
| 2006/0053410 | A1 * | 3/2006 | Charisius et al. | 717/109 |
| 2006/0064676 | A1 * | 3/2006 | Chavan | 717/124 |
| 2006/0064677 | A1 * | 3/2006 | Bickson et al. | 717/124 |
| 2006/0070023 | A1 * | 3/2006 | D'Souza et al. | 717/104 |
| 2006/0212758 | A1 * | 9/2006 | Drake | 714/38 |
| 2008/0016149 | A1 * | 1/2008 | Shitomi et al. | 709/203 |
| 2008/0066191 | A1 * | 3/2008 | Farber et al. | 726/28 |

* cited by examiner

*Primary Examiner* — Insun Kang
(74) *Attorney, Agent, or Firm* — Steven M. Greenberg, Esq.; Carey Rodriguez Greenberg Paul, LLP

(57) ABSTRACT

A source container for use in a computer system executing problem determination tools in an integrated environment across a computer network, the source container comprising a list of pathways to a plurality of source files and module objects. A software development may create the source container independently or within the front end of a problem determination tool. The front end of the problem determination tools sends the source container to its engine, and only source files and module objects having a pathway in the source container are analyzed within the engine of the problem determination tool. Furthermore, the results of the analysis of only those source files and module objects having a pathway in the source container are returned to the front end of the problem determination tool for viewing by the software developer. The front ends of the tools of the integrated development environment, the source files, the module objects, the engines of the tools, and different tools may all be located on different servers and/or clients across a computer network.

24 Claims, 5 Drawing Sheets

CONSTRAINING SOURCE CODE AND OBJECTS FOR ANALYSIS TOOLS

CROSS-REFERENCE TO RELATED APPLICATIONS

This invention relates to U.S. patent application Ser. No. 10/905,619 entitled METHOD, SYSTEM AND PROGRAM PRODUCT FOR LOCATING REMOTE SOURCE FILES filed 13 Jan. 2005, commonly owned by the assignee.

BACKGROUND OF THE INVENTION

This invention relates generally to the field of developing computer software in integrated development environments and more particularly relates to constraining the amount of source code used by runtime analysis tools.

Computer software development has its own terminology and, herein at the beginning, a tutorial in definitions as used herein may be helpful. Software is object code and source code. Object code is the output from a compiler or assembler and is the code that is executable by the computer machine itself or can be used to create executable machine code. Source code is the input to a compiler or assembler typically written by a human in a source language, such as C++ or JAVA, and is capable of being read and edited by a human. In object-oriented programming (OOP) and other highly modular languages, a single general purpose portion of code, called an object within the computer program may execute multiple times for multiple purposes. An object includes data and/or one or more sets of instructions as routines or methods that define specific operations to be performed on the data. A number of objects can be "glued" together to build a component or an entire computer program with each object interacting with other objects or components in the computer program to perform desired operations. When one object invokes a particular routine in another object, the former object is said to be calling the routine in the latter object. General purpose objects in a computer program may support basic operations, e.g., displaying information to a software developer, printing information on a printer, storing or retrieving information from a database, etc. A component is generally larger than an object and is a specific portion of code that can also be reused across multiple applications; in other words, a component is standard software that can be pulled off a server and incorporated into new applications using a tool by software developers. For example, a calendar component may be used in several applications such as a scheduling application, a presentation application, a data base application to calculate employee's vacation and pay, etc. An application is a software program used by an end software developer; examples of applications include a scheduling client program or application wherein a person may schedule employees' work days; a word processing application; a presentation application to prepare slides for a talk; a database application in which to manipulate data; a spreadsheet application, etc. A tool is a software application that enables a software developer to write additional applications. Examples of tools include: a remote-accessing tool; a database tool to access and manipulate remote relational databases; a message queue tool to access and manipulate remote messages; an import tool to select files on a remote system to import into an ongoing software development project; a performance tool to access and configure remote performance; a tracing tool to trace execution of a program in a remote system, a file tool to access folders and files in a remote file system, etc. Thus, a software developer uses tools to pull components usually made up of objects from a local or remote server to create applications.

Software developers found it was first convenient to have all code generation tools under one umbrella, called an integrated development environment (IDE). Integrated development environments, as the name suggests, give the software engineer an environment having the tools for source code editing, compiling, linking, testing, debugging, and profiling seamlessly integrated. The advantage of using an IDE is that the software developer need not be concerned about the tool interfaces when moving from one phase of code development to the other. The IDE may track the phase of code generation and appropriately invoke the necessary tool. An example of a software development, analysis, and maintenance environment is GENERA which was developed by SYMBOLICS and LISP. For UNIX programmers, FUSE is an integrated development environment that has tools that include editors, program builders, source code managers, debuggers, cross-referencers, call graph browsers, file comparison tools, main page hypertext viewers, search tools, performance profilers, heap analyzers, program visualizers, and an optional C++ class browser. Other examples include IBM® VISUALAGE® C++ and VISUALAGE for JAVA™. VISUALAGE C++ provides an environment and toolset for multiplatform object-oriented application development with class libraries and frameworks to build applications on AIX®. VISUALAGE FOR JAVA is IBM's JAVA development environment to build web-enabled enterprise applications with support for building and testing JAVA applets, servlets, and ENTERPRISE JAVABEANS. There are other integrated development environments but basically, an integrated development environment provides a complete capability for building, editing, compiling, dynamically and statically analyzing programs, configuring, source browsing, and debugging, etc. IBM, AIX and VisualAge are trademarks of International Business Machines Corporation in the United States, other countries, or both while Java is a trademark of Sun Microsystems, Inc. in the United States, other countries, or both.

IBM and REDHAT developed an open source integrated development environment called Eclipse™ that supports C and C++ in addition to JAVA for software development. Eclipse software runs not only on the LINUX™ operating system but also other operating systems. There is special interest in the LINUX operating system because it is an open source operating system not belonging to a single entity but is owned and developed by the public. The Eclipse integrated development environment is thus an open source environment for creating, integrating and deploying application development tools across a broad range of computing technology. Eclipse software provides a common set of services and establishes the framework, infrastructure, and interactive workbench to build application software and related elements. Eclipse software includes, inter alia, a source code editor with code browsing and navigation features like code assist, syntax based color highlighting and integrated help facilities that uses a graphical software developer interface. Eclipse is a trademark of the Eclipse Foundation in the United States, other countries, or both while Linux is a trademark of Linus Torvalds in the United States, other countries, or both.

Functions incorporated into the tools of an integrated development environment may include debugging, tracing, profiling, and logging. Debugging locates and identifies errors in a computer program under development; tracing prints the values of the variables and identifies the conditions at a particular statement; profiling analyzes the performance of an application and ascertains where and if any problems occur; logging and other code coverage and testing tools are also problem detections tools of an integrated development environment.

Conventional debuggers support two primary operations to assist a computer software developer, the first of which is a "step" function that permits a software developer to process statements one at a time in a computer program and see the results of each instruction upon completion. The step operation provides a programmer with a large amount of information about a program during its execution but the task of stepping through hundreds or thousands of program instructions may be tedious and time consuming. In fact, the programmer may be required to step through many program instructions already known to be error-free before the desired set of instructions to be analyzed are executed.

A second operation supported by conventional debuggers is a breakpoint operation that permits a computer programmer to halt the execution of a computer program at a precise instruction. Used together, step operations and breakpoints simplify the debugging process. A computer program executes normally by a debugger until a breakpoint is reached, at which point the program stops execution and the debugger displays the results of the computer program to the programmer for analysis. The programmer then steps through the code line-by-line using the step operation. Consequently, a programmer is able to isolate and analyze a particular set of instructions without having to step through irrelevant portions of a computer program.

As mentioned, there can be many generic objects called many times in an application so that placing a conventional breakpoint in a routine of one of these generic objects will result in hundreds of unwanted stoppages prior to occurrence of a desired stoppage. Thus, context sensitive breakpoints were developed and set in certain debuggers to retrieve the sequence of routines in the computer program that are called just prior to reaching the breakpoint. Context sensitive breakpoints locate the specific calls in other objects that relate to the desired stoppage in a particular object and, as a result, may reduce the time consuming and task of setting each breakpoint, as well as the risk that not all relevant calls are found so not all desired circumstances for inducing stoppages may be recognized during debugging.

Despite context-specific breakpoints used in debuggers, too much information may be sent to the debuggers, i.e., the search space is too large for the expected task, and/or the tools return too much information to the developer, i.e., the result space is too massive to be useful, or may not be relevant to the developer's area of interest.

There may be many files of source code open and several debug tools and sessions may be required to debug the application, especially if execution of the application is on multiple remote servers. One approach to support breakpoint operation in different debug sessions on multiple servers is that a user sets the source breakpoints at a client having the debugger's front end that gathers and sends all the set source breakpoints to the various remote debugger engines. For any given breakpoint, each debugger engine searches through the source file names in the objects, e.g., the programs and shared libraries, specified as targets to debug, in order to determine if there is a match of certain properties, such as file name, line number, etc. If there is a match, a breakpoint will be installed, otherwise, the source breakpoint is deferred meaning that the source file name and line number information of the breakpoint are retained in the debug engine but no real breakpoint is set. Later when other objects are loaded during the debug session, the debug engine again attempts to install these deferred source breakpoints. Thus, an analysis tool engine processes many source breakpoints a number of times despite the fact that most of them are not applicable to the source code being debugged.

Some implementations of debugger front ends are able to circumscribe the scope of the project and limit the source breakpoints in the entire IDE. A project contains source code and related files for building a program and maintains a model of the type hierarchy, references and declarations of source elements. As the user changes the source code, the model is constantly updated independently of the builder; that is, when the code is modified, even though an autobuild feature is turned off, the model still reflects the project modifications and contents. As a result, a developer may not be able to debug code that comes from an outside project such as C/C++ standard library headers or code from a JAVA Runtime Environment (JRE). Thus, this solution of limiting the scope of source breakpoints to a particular project does not address the whole problem for a real world application.

Profiling tools may be able to use one or a combination of more than one filter to constrain the scope of the data sent to the profiling tool and/or the data returned to the developer for review. A query filter constrains the data sent to tool engine whereas a view filter constrains the results presented to the software developer. A query result filter constrains the data that is returned to an IDE from a tool engine.

In an IDE, source files are the core point of focus. Developers write and compile source code to create an application. A software developer then uses an IDE to step through the execution of the code to debug, to monitor the performance statistics for parts of that application, and/or to examine the code coverage. At all times, the fundamental object of analysis is the source code itself such that the source code ultimately limits the results of interest to a software developer. Thus, in a sense, query filtering which circumscribes the search space constrains the source code and because source code is common for all such analysis tools, it follows that software developer may be able to define a query and result filter common to all the tools.

BRIEF SUMMARY OF THE INVENTION

According to a one aspect of the invention, a method comprises calling a problem determination tool, storing a relevant data unit of a file that will be used by the problem determination tool, putting a path to the file into a source container at a front end of the problem determination tool, and transmitting the source container to an engine of the problem determination tool.

According to another aspect of the invention, a computer program product for constraining the amount of data in an integrated development environment comprises a computer usable medium having computer usable program code embodied therein. The computer usable program code comprises computer usable program code configured to call a problem determination tool, computer usable program code configured to store a relevant data unit of a file that will be used by the problem determine tool, computer usable program code configured to put a path to the file into a source container at a front end of the problem determination tool, and computer usable program code configured to transmit the source container to an engine of the problem determination tool.

According to yet another aspect of the present invention, a computer program product for constraining the amount of data in an integrated development environment comprises a computer usable medium having computer usable program code embodied therein. The computer usable program code comprises computer usable program code configured to allow a user to select a file for problem determination, computer usable program code configured to store a pathway of the selected file in source container, computer usable program code configured to invoke a front end of a problem determination tool, computer usable program code configured to transmit the source container to an engine of the problem determination tool, computer usable program code configured to analyze only the file whose pathway is in the source container, and computer usable program code configured to return the results of analysis of the selected source file or module object whose pathway is in the source container to the user.

According to a further aspect of the present invention, a computer program product for constraining the amount of data in an integrated development environment comprises a computer usable medium having computer usable program code embodied therein. The computer usable program code is configured to create a source container, the contents of the source container being a list of pathways to a plurality of files which will execute within an integrated development environment to determine if any problems exist with the execution.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
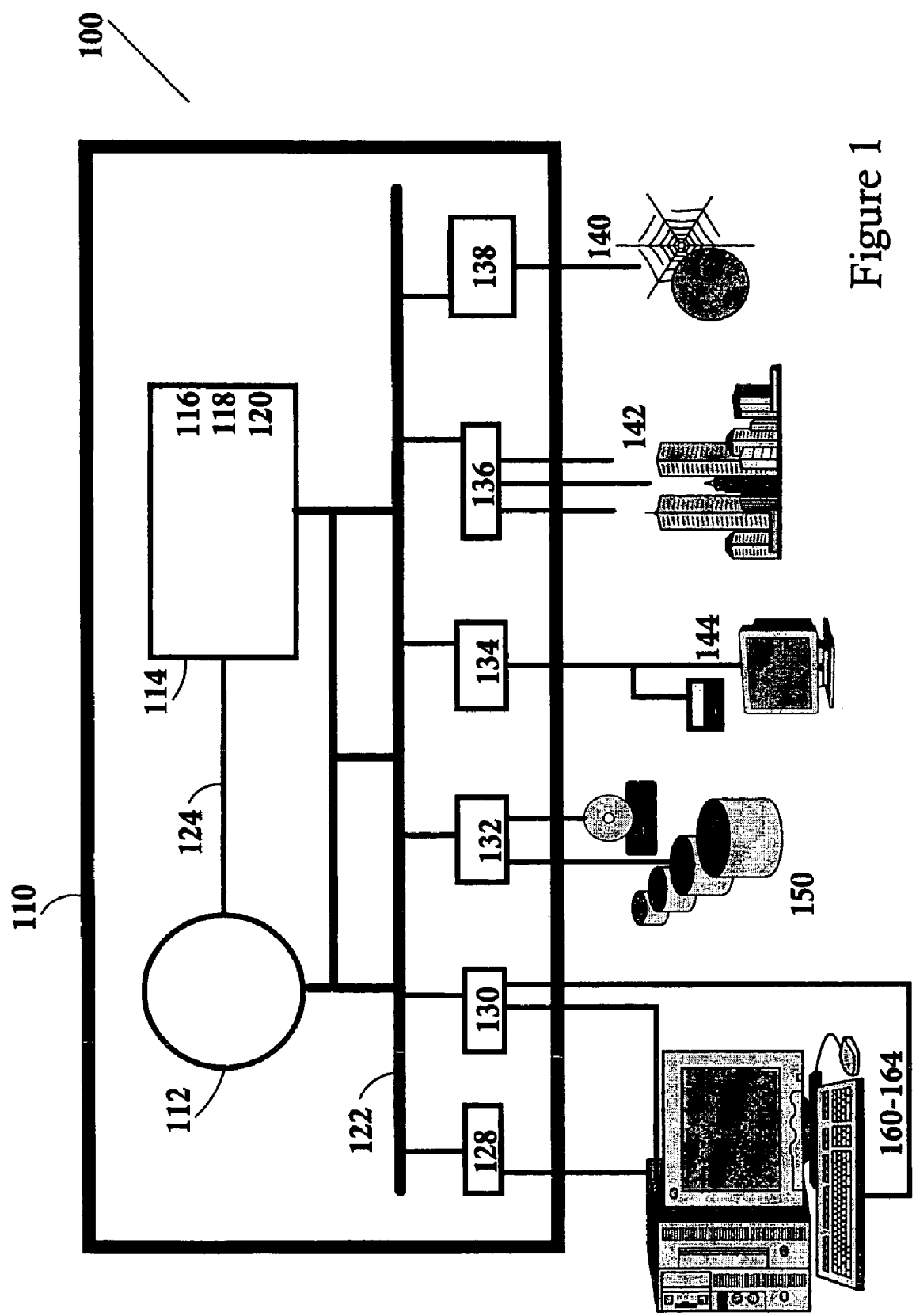
FIG. 1 is a simplified block diagram of a computer network having an object system.

The invention is described with reference to the accompanying drawings; however, the invention may be embodied in many different forms and should not be construed as limited to the embodiments set forth herein. Rather the illustrated embodiments are provided so that this disclosure is thorough and complete, and fully conveys the scope of the invention to those skilled in the art. Like numbers refer to like elements throughout.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer usable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-usable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, a high-level block diagram of a computer network system 100 consistent with an embodiment of the invention is shown. Computer network system 100 may comprise any number of networked computers 110, each of which may have a central processing unit (CPU) 112, main memory 114, and various digital and/or analog interfaces 128-138. The various devices communicate with each other via internal communications bus 122. CPU 112 is a general-purpose programmable processor, executing instructions stored in memory 114; while a single CPU is shown in FIG. 1, it should be understood that computer systems having multiple CPUs could be used. Communications bus 122 supports transfer of data, commands and other information between different devices, and while shown in simplified form as a single bus, it is typically structured as multiple buses including an internal bus 124 which may connect the CPU 112 directly with memory 114.

Memory 114 may be a random-access semiconductor memory for storing data and programs; memory 114 is shown conceptually as a single monolithic entity but it is well known that memory is often arranged in a hierarchy of caches and other memory devices, some or all of which may be integrated into the same semiconductor substrate as the CPU 112. Random access memory (RAM) devices comprising the main storage of computer, as well as any supplemental levels of memory, e.g., cache memories, nonvolatile or backup memories, programmable or flash memories, read-only memories, etc. In addition, memory 114 may be considered to include memory storage physically located elsewhere in computer, e.g., a cache memory in a processor or other storage capacity used as a virtual memory, e.g., as stored on a mass storage device or on another computer coupled to computer via network.

Operating system 116 and applications 118, 120 reside in memory 114. Operating system 116 provides, inter alia, functions such as device interfaces, management of memory pages, management of multiple tasks, etc. as is known in the art. It will be appreciated by those skilled in the art that the operating may comprise one or more appropriate operating systems These and other various applications, components, programs, objects, modules, etc. may also execute on one or more processors in another computer coupled to computer 110 via a network 140, 142, e.g., in a distributed or client-server computing environment, whereby the processing required to implement the functions of a computer program may be allocated to multiple computers 110 over a network 140, 142.

The invention is equally applicable to any microprocessor device having an operating system in which the microprocessor or processing device is connected across a network to devices having the same or different operating systems. In general, the routines executed to implement the embodiments of the invention, whether implemented as part of an operating system or a specific application, component, program, object, module or sequence of instructions will be referred to herein as computer programs or simply programs. The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Applications 118, 120 may include a source container as described herein as part of or callable from an integrated development environment, and if a server software application is included, network interface 136, 138 may interact with the server software application to enable computer system 110 to be a network server.

It should be appreciated that computer 110 may include suitable analog and/or digital interfaces 128-138 between CPU 112 and the attached components as is known in the art. For instance, computer 110 typically receives a number of inputs and outputs for communicating information externally. For interface with a software developer or operator, computer 110 may include one or more software developer input devices 160-164, e.g., a keyboard, a mouse, a trackball, a joystick, a touchpad, and/or a microphone, among others, and a display such as a CRT monitor, an LCD display panel, and/or a speaker, among others. It should be appreciated, however, that some implementations of computer 110, e.g., some server implementations, might not support direct software developer input and output. Terminal interface 134 may support the attachment of single or multiple terminals 144 and may be implemented as one or multiple electronic circuit cards or other units. Data storage 150 may comprise one or more rotating magnetic hard disk drive units, although other types of data storage, including a tape or optical driver, could be used. For additional storage, computer 110 may also include one or more mass storage devices 150, e.g., a floppy or other removable disk drive, a hard disk drive, a direct access storage device (DASD), an optical drive e.g., a compact disk (CD) drive, a digital video disk (DVD) drive, etc., and/or a tape drive, among others.

Furthermore, computer 110 may include an interface 136, 138 with one or more networks 140, 142 to permit the communication of information with other computers 110 coupled to the network(s) 140, 142. Network interface(s) 136 138 provides a physical connection for transmission of data to and from a network(s) 140, 142. Network(s) 140, 142 may be the Internet, as well as any smaller self-contained network such as an Intranet, a wide area network (WAN), a local area network (LAN), or other internal or external network using, e.g., telephone transmissions lines, satellites, fiber optics, T1 lines, public cable, etc. and any various available technologies. One of ordinary skill in the art understands that computer system 100 may be connected to more than one network 140, 142 simultaneously. Computer system and remote systems 110 may be desktop or personal computers, workstations, a minicomputer, a midrange computer, a mainframe computer. Any number of computers and other microprocessor devices, such as personal handheld computers, personal digital assistants, wireless telephones, etc., which may not necessarily have full information handling capacity as the large mainframe servers, may also be networked through network(s) 140, 142.

While the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks, e.g., CD-ROMs, DVDs, etc., among others, and transmission type media such as digital and analog communication links. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature. The illustrated embodiments are not intended to limit the present invention. Indeed, those skilled in the art will recognize that other alternative hardware and/or software embodiments may be used without departing from the scope of the invention.

In the following description of the invention, the use of debugger and profiling tools are intended only as examples of problem determination or analysis tools upon which the source container of the invention may be implemented. One of skill in the art will understand that although the embodiments described herein are fully applicable to debugger and other analyses tools; the source container and its features are also applicable to all those tools which are used to determine and identify problems during the development of software, especially in an IDE. Problem determination tools are a set of applications, whether a part of or separate from an IDE, that help programmers easily and quickly identify the problems and errors in other applications that the programmers develop.

At this time it is useful to further present some specific concepts related to implementations of the various embodiments of the source container in the several tools. Search space may be defined as the source code or program objects upon which a tool acts or interrogates. Analysis space is the amount of data the tools actually analyze and is a subset of the search space constrained by the source container. The result space, may include the performance data generated by the tools by analyzing the analysis space and is returned to the tool's front end at the developer. A source breakpoint is a breakpoint set to a source code file; a software developer can set a source breakpoint in an editor by merely double clicking or otherwise activating a user-defined function and need not even know the program or share library to which the code will be compiled. During execution of a tool session, execution will stop at the source breakpoint. Launching a debug session means to debug an application or a process inside an IDE. Launching a profiling session means to run a profiling tool against an application from an IDE. To define a Debug Launch Configuration means to include all the information needed to launch a debug session; for example, the process identification to which to attach, the name and arguments for program to debug, etc. In one aspect of the present invention, the Debug Launch Configuration may also include a source container. To define a Profile Launch Configuration includes all the information needed to run a profiling tool against an application, for example, the name and path of an application, the parameters and the environment of this application. In a preferred embodiment, the Profile Launch Configuration also includes a source container. A source container constrains the analysis done on the application and has a list of file paths of a local or remote system that an analysis tool uses to circumscribe or limit the source code or the program objects of the tool's operations; the source code can be located in a local or remote folder, a local project, or remote archive files. The source container as an embodiment of the invention herein not only constrains the search space for runtime analysis tools so that an IDE limits the data sent to the tools, but also scopes the analysis space, i.e., the amount of analysis done by those tools, and the result space returned to developer.

Figure 2:
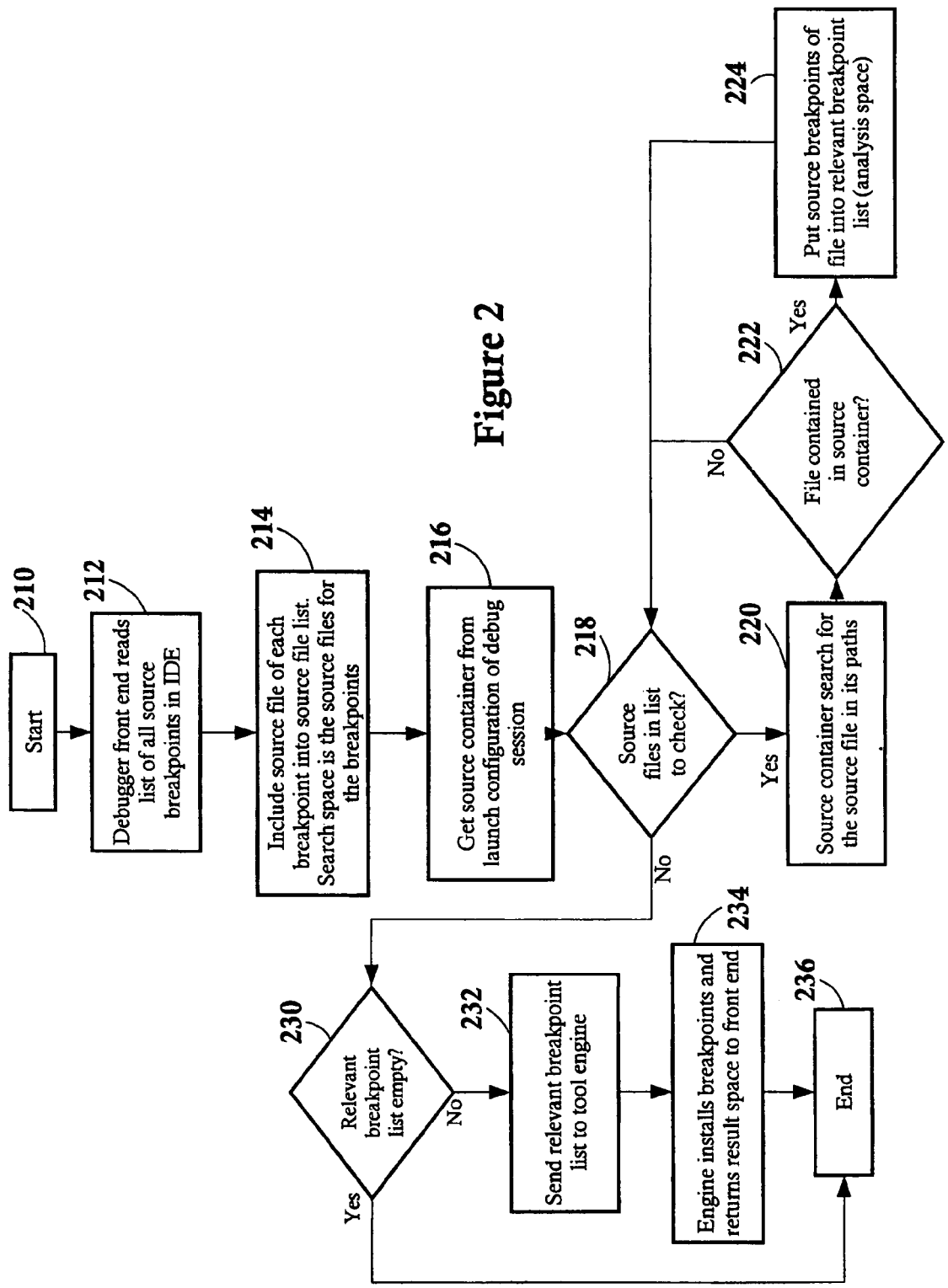
FIG. 2 is a simplified flow chart of how the source container can be used to define breakpoints during initialization of a debug session in accordance with an embodiment of the invention.

Referring now to FIG. 2, the process steps of a debugger tool will be described. Starting in step 210, the front end of the debugger tool loads the list of all the source breakpoints in the IDE as in step 212. The source breakpoints may be set by a developer before she/he launches a debug session or may be retrieved from a cached source breakpoint list created during a previous debug session. In step 214, the debugger front end places the source file for each breakpoint into a source file list. The debugger front end also obtains a source container from the launch configuration of the debug session in step 216. In step 218, the process determines if there are any source files in the list created in step 214 to check. If so, then at step 220, the source container called from the launch configuration of the debug session searches for the source file amongst the source file paths in the source container. If the file is found in the source container, as in step 222, then the source breakpoints of that file are included in the relevant breakpoint list, i.e., the search space, at step 224, which then returns to determine if there are more source files to check at step 218. If the source file in not contained in the source container, as in step 222, then the process also loops back to determine if there are more source files to check at step 218. If, at step 218, there are no more source files to check, then at step 230, the method herein determines if the relevant breakpoint list is empty. If not, then at step 232, the relevant breakpoint list is sent as analysis space to the tool engine which may be installed on a remote client or server. In step 234, the tool's engine installs the breakpoint list for analysis. Then, the process ends at step 236 or if the relevant breakpoint list is empty.

Figure 3:
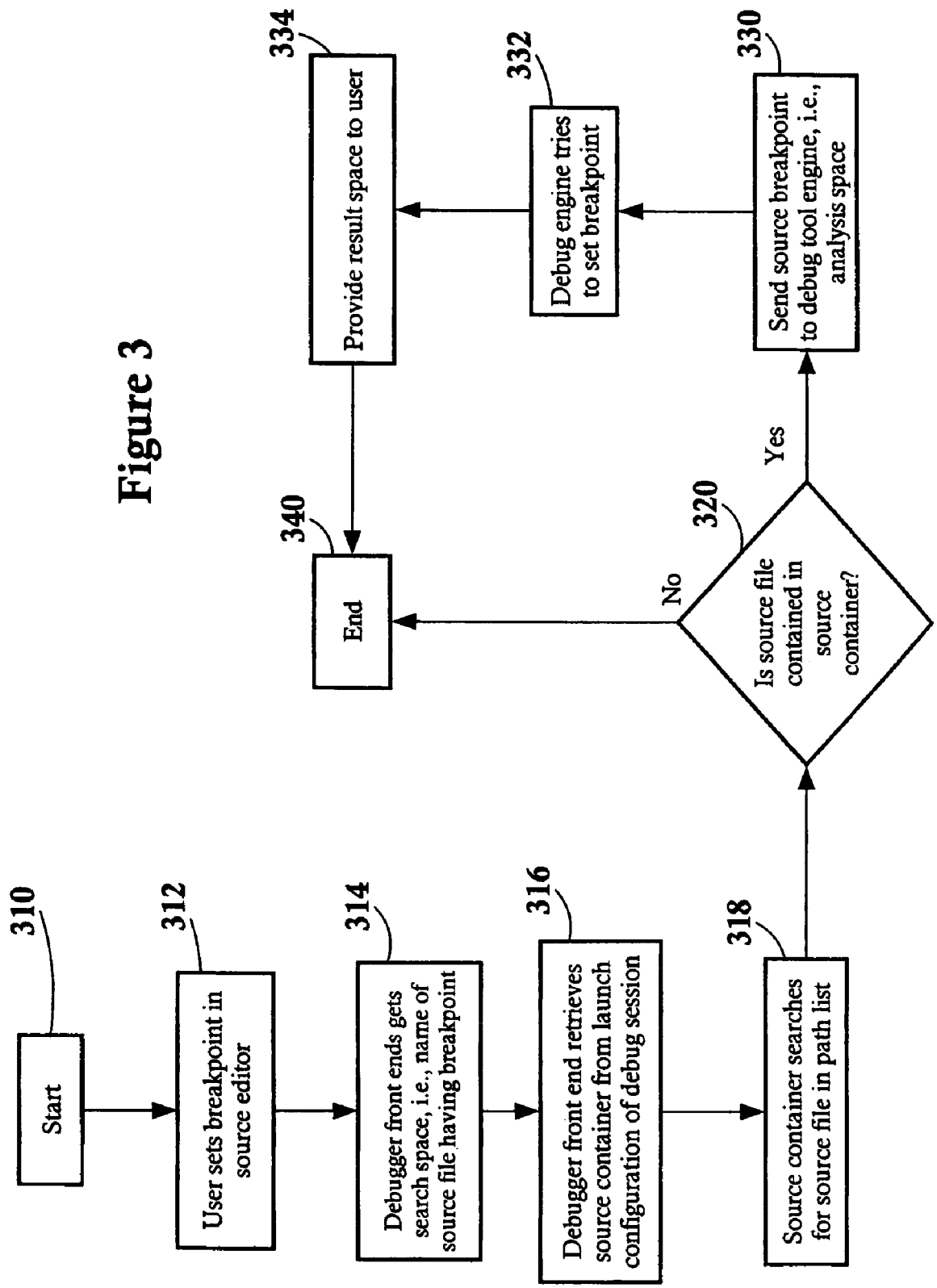
FIG. 3 is a simplified flow chart of a method of how the source container can be used by a debug tool in accordance with an embodiment of the invention.

FIG. 3 illustrates the steps the process undertakes to select the relevant breakpoints during a debug session. Starting at steps 310 and 312, a software developer will select a breakpoint in the source code using an editor in an IDE. The debugger front end obtains the name of the source file of this breakpoint at step 314. At step 316, the debugger front end obtains the source container from the launch configuration of the debug session. The source container then searches for the source file of the breakpoints in its paths at step 318. If, at step 320, the source file is contained in the source container, then the source breakpoints are sent to the debugger engine at step 330. The debug engine then attempts to set the breakpoint as in step 332. If successful, then at step 334, feedback is provided to the software developer who set the breakpoints. If, on the other hand, the source file is not contained in the source container, in step 320, or after feedback is presented to the software developer in step 334, the process ends at step 340.

For example, suppose a software developer works with two source files, i.e., HelloWorld.c and MyHelloWorld.cpp. Assume HelloWorld.c is located at /computer/drive/partition1/folder1/folder2 and MyHelloWorld.cpp is located at computer/drive/partition1/folder3. A developer sets one source breakpoint on line 15 of source file HelloWorld.c in an IDE. The software developer sets another source breakpoint on line 36 of MyHelloWorld.cpp in IDE. Now the software developer updates the source container of the tool's launch configuration to include the remote folder where HelloWorld.c resides. When the software developer activates the tool to start the session, the implementation of the tool's front end gathers the list of source files that contain the selected source breakpoints, in this case, HelloWorld.c and MyHelloWorld.cpp. For each source file, the tool calls SourceLocator::containSource to determine if HelloWorld.c and MyHelloWorld.cpp are contained in the source container. Because the source code for HelloWorld.c is contained in remote path "computer/drive/partition1/folder1/folder2/HelloWorld," the call from the tool's front end, the application program interface, returns a value of "true" and the source breakpoint is added to the relevant source breakpoint list. But, however, MyHelloWorld.cpp is not contained in the source container so the call to the tool's front end returns "false" and the breakpoint for line 36 of MyHelloWorld.cpp is not added to the relevant source breakpoint list. Thus, only one relevant source breakpoint is sent to the tool's engine.

Figure 4:
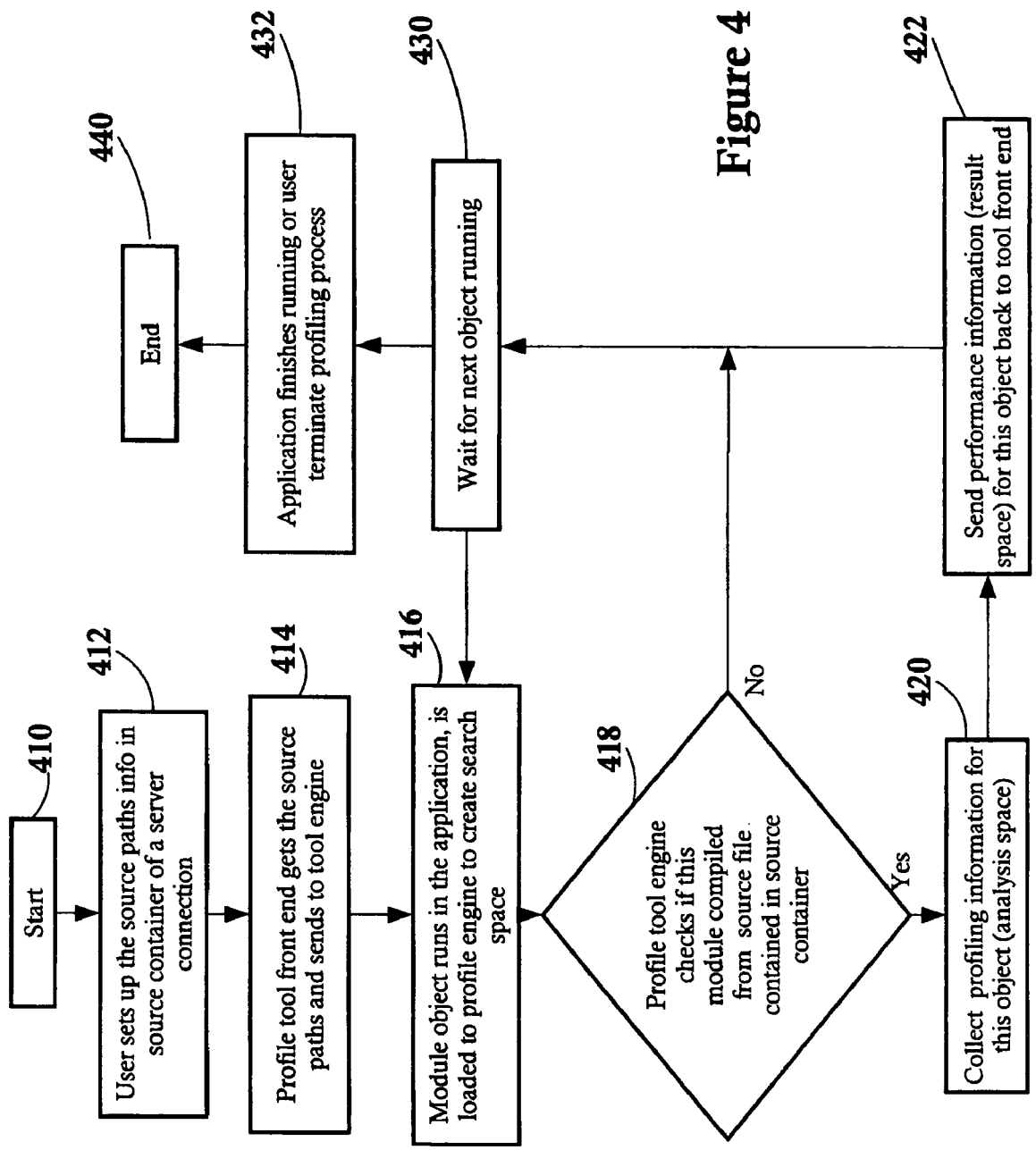
FIG. 4 is a simplified flow chart of a method to scope the search space using a source container with a profiling tool in accordance with an embodiment of the invention.

FIG. 4 presents the steps of the process in which the amount of data sent to, analyzed by, and returned from a profiling tool can be circumscribed by a source container. Recall that "to scope" means to constrain the source code and program objects that the tools analyze and a profiling tool is one which analyzes the performance of an application. At steps 410 and 412, the software developer starts and adds the source paths, i.e., the paths of the source files for which the developer wishes to obtain profiling information, into a source container. At step 414, the profile tool's front end obtains the source paths set up by the user from the source container and sends the source paths to the profiler's engine. In step 416, the source files or module objects are loaded to the profile tool engine as analysis space, execute, and, at step 418, the engine determines if the executing module is compiled from the source files contained in the source container. If so, then in step 420, the profiling information for the object is collected and in step 422, the performance data is returned to the profile tool's front end for display of the result space to the software developer. If however, the executing module, is not compiled from source files contained in the source container, as in step 418, then the process waits for the next object or source file to execute as in step 430. After the application finishes executing or if the software developer terminates the process, at step 432, the process ends at step 440.

Figure 5:
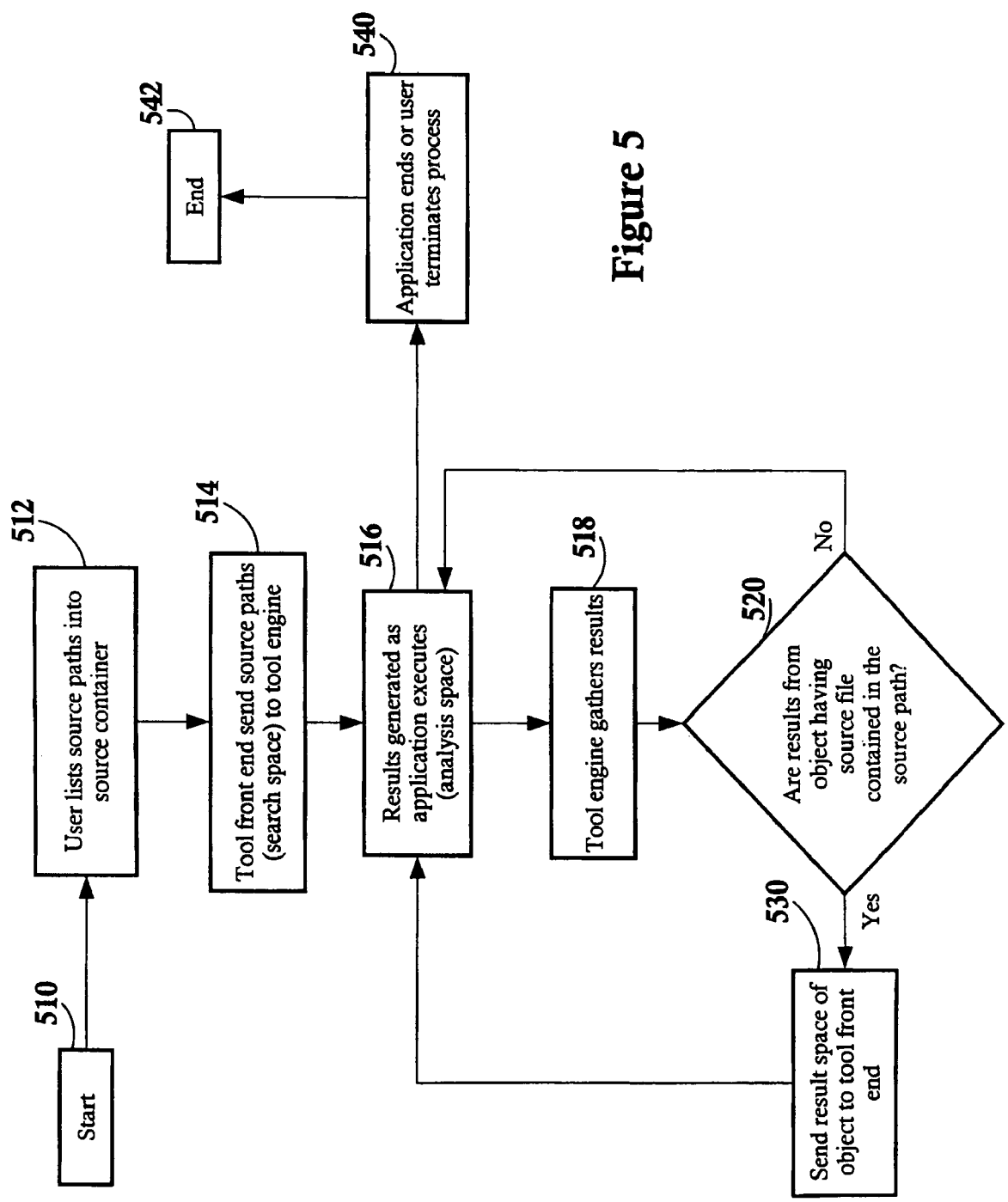
FIG. 5 is a simplified flow chart of a method to scope the search space using a source container with a tracing and/or a logging tool in accordance with an embodiment of the invention.

FIG. 5 is an example of how to use the process described herein with a tracing or a logging tool. Recall that when the source code or an object is executing, a tracing and/or logging tool returns the values of variables at predetermined points. At steps 510 and 512, the software developer again includes the source paths of the source files of interest in a source container of a server or a client connection. In step 514, the tool's front end sends the source paths to the tool's engine, which may be located on a remote computer. Recall that the source container is a front end object. When communicating with the tool's engine the front ends sends the source paths. In step 516, the source files are executing and generating the tracing and/or logging information which, in step 518, is forwarded to the tracing and/or logging tool. At step 520, the tool then determines if the results are generated from an object whose source path is located in the list of source paths forwarded to the tool's engine. If the results are filtered, then at step 530, the results are returned to the tool's front end for review by the software developer. If the executing object is not compiled from source files in the specified source paths, then the application continues to execute and the tool engine continues to determine if it needs to check the next executed program object until if finishes or until the software developer terminates the tracing or logging process at in step 540 and the process ends in step 542. The tool's engine only triggers tracing or logging when the object been running is actually compiled from the source files contained in the source container. It is similar in code coverage tool. The tool's front end sends down the source lookup paths to its engine but again the tool's engine reports the execution path for the source files contained in the source lookup path.

With an IDE such as Eclipse, there may be tens or hundreds of breakpoints accumulated across different tool sessions and across different servers. If all those breakpoints are sent to every tool's engine, not only does network traffic increase unnecessarily but also the time for the tool's engine to process the breakpoints also increases dramatically. For any given breakpoint, each tool engine conventionally searches through the source file names in the objects, i.e., the programs, shared libraries specified to determine if there is a match. If a match exists, a breakpoint is installed, otherwise, this source breakpoint stays in the tool's engine. When other objects are loaded during the debug session later, the tool's engine tries to install all the source breakpoints again. Usually an engine processes hundreds of source breakpoints sent despite the fact that most of them are not applicable to the code executing. The invention as described herein automatically constrains the number of breakpoints sent to a tool's engine, i.e., the search space, and scopes the amount of data send to those tools which, in turn, reduces the amount of analysis done by those tools, i.e., the analysis space, and further reduces the amount of result sent back to developer, the result space.

This invention allows a software developer to set constraints and limit the scope of data points in which she/he is interested across an IDE using the source container. The source container passes only relevant units of data to a tool engine. For different tools, relevant units of data have different meanings: for debugger tools, the relevant units of data are source breakpoints; for profiling, tracing, and logging tools, relevant units of data means the program objects that the tools are going to process.

This invention may be used in an IDE, such as Eclipse, but is not intended to be limited to either any particular application or programming language. For instance, a profiling engine could pass data collection points which could be represented as some other kind of marker in eclipse. Because each of these source points, or markers, are associated with source code, the constraint mechanisms that already exist for source code could be used to constrain the search space for a tool. The source container, effectively used a view filter, can also be used inversely as a query filter to improve the performance.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While various embodiments of the present invention have been described above, it should be understood that they have been presented by way of example and not limitation and that variations are possible. Thus, the breadth and scope of the present invention should not be limited by any of the above-described exemplary embodiments, but should be defined only in accordance with the following claims and their equivalents.

What is claimed is:

1. A method comprising:
   calling a problem determination tool;
   storing a relevant data unit of a file that will be used by the problem determination tool;
   putting a path to the file into a source container at a front end of the problem determination tool; and
   transmitting the source container to an engine of the problem determination tool.

2. The method of claim 1, further comprising:
analyzing only relevant data units of the file.

3. The method of claim 2, further comprising:
returning the results of the analysis of only the relevant data units of the file to the front end of the problem determination tool.

4. The method of claim 1, wherein
the problem determination tool comprises one of a debugger tool, a profiling tool, a logging tool and a tracing tool.

5. The method of claim 1, wherein
the relevant data unit comprises a source breakpoint.

6. The method of claim 1, wherein
the problem determination tool is one of a plurality of tools in an integrated development environment.

7. The method of claim 1, wherein
the file comprises one of a source file and a module object.

8. A computer-readable storage medium having stored thereon computer usable program code for constraining an amount of data in an integrated development environment, the computer usable program code, which when executed by a computer hardware system, causing the computer hardware system to perform:
calling a problem determination tool;
storing a relevant data unit of a file that will be used by the problem determination tool;
putting a path to the file into a source container at a front end of the problem determination tool; and
transmitting the source container to an engine of the problem determination tool.

9. The computer-readable storage medium of claim 8, further comprising:
analyzing only relevant data units of the file.

10. The computer-readable storage medium of claim 9, further comprising:
returning the results of the analysis of only the relevant data units of the file to the front end of the problem determination tool.

11. The computer-readable storage medium of claim 8, wherein
the problem determination tool comprises one of a debugger tool, a profiling tool, a logging tool and a tracing tool.

12. The computer-readable storage medium of claim 8, wherein
the relevant data unit comprises a source breakpoint.

13. The computer-readable storage medium of claim 8, wherein
the problem determination tool is one of a plurality of tools in an integrated development environment.

14. The computer-readable storage medium of claim 8, wherein
the file comprises one of a source file and a module object.

15. A computer-readable storage medium having stored thereon computer usable program code for constraining an amount of data in an integrated development environment, the computer usable program code, which when executed by a computer hardware system, causing the computer hardware system to perform:
allowing a user to select a file for problem determination;
storing a pathway of the selected file in source container;
invoking a front end of a problem determination tool;
transmitting the source container to an engine of the problem determination tool;
analyzing only the selected file, the pathway of which is in the source container; and
returning the results of analysis of the selected file to the user.

16. The computer-readable storage medium of claim 15, further comprising
invoking a problem determination tool, wherein
the problem determination tool is one of
a debugging tool,
a tracing tool,
a profiling tool and
a logging tool.

17. The computer-readable storage medium of claim 15, wherein
the problem determination tool is one of a plurality of tools in an integrated development environment.

18. The computer-readable storage medium of claim 15, wherein
the selected file comprises one of a source file and a module object.

19. The method of claim 1, wherein
the source container constrains analysis, by the problem determination tool, of an application.

20. The method of claim 19, wherein
the source container constrains at least one of search space, analysis space, and result space.

21. The computer-readable storage medium of claim 8, wherein
the source container constrains analysis, by the problem determination tool, of an application.

22. The computer-readable storage medium of claim 21, wherein
the source container constrains at least one of search space, analysis space, and result space.

23. The computer-readable storage medium of claim 15, wherein
the source container constrains analysis, by the problem determination tool, of an application.

24. The computer-readable storage medium of claim 23, wherein
the source container constrains at least one of search space, analysis space, and result space.

* * * * *